May 3, 1932. E. E. WILSON 1,857,072
BAIT CONTAINER AND CUTTING BOARD
Filed Dec. 3, 1930
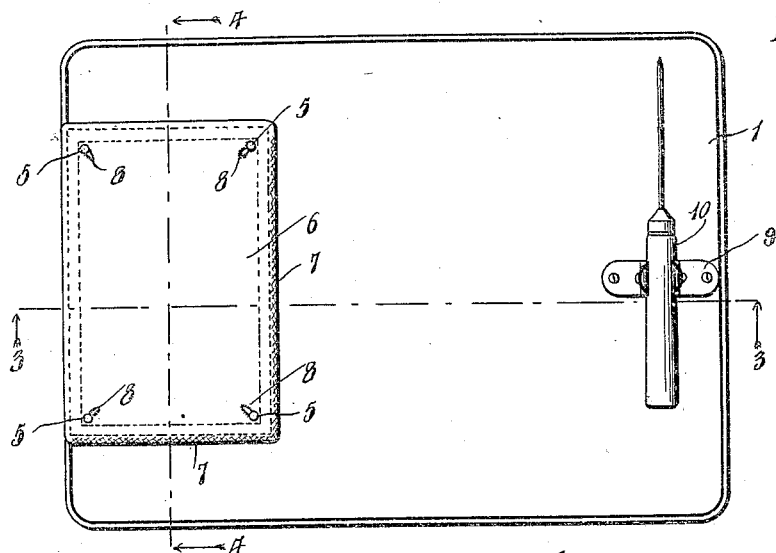
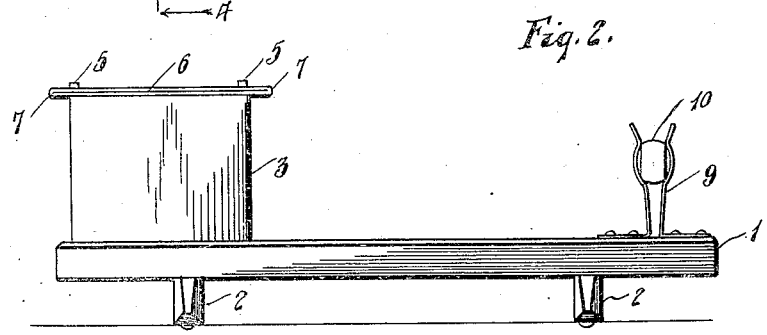
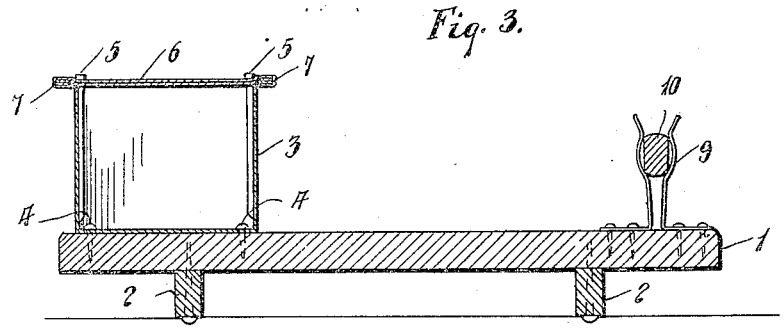
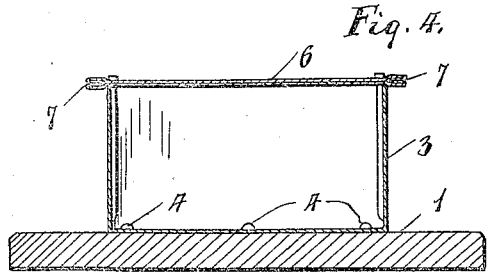
Inventor
E. E. Wilson.
By
Attorney Patented May 3, 1932

1,857,072

UNITED STATES PATENT OFFICE

ELMER E. WILSON, OF SANTA CLARA, CALIFORNIA

BAIT CONTAINER AND CUTTING BOARD

Application filed December 3, 1930. Serial No. 499,789.

The invention relates to a device that is primarily useful for fishermen for holding and maintaining alive "live bait", and providing a board for cutting the bait and including a clip mounted on the board for holding the knife or other tool for operation for cutting the bait.

The invention will be described in detail hereinafter and will be found illustrated in the accompanying drawings in which Figure 1 is a top plan view of the improved bait container and cutting board, Figure 2 is a side view in elevation, Figure 3 is a longitudinal sectional view on a plane indicated by the line 3—3 of Figure 1, and Figure 4 is a transverse sectional view on a plane indicated by the line 4—4 of Figure 1.

In the drawings similar reference characters will be used to designate corresponding parts throughout the several views.

The invention comprises a cutting board 1 mounted on suitable leg members 2, and adapted to be used for cutting bait as heretofore stated. Adjacent to one of the end margins of the board is a receptacle 3, secured thereto by means of suitable fastening means 4 and adapted to hold live bait conveniently for use by fishermen. The receptacle 3 as disclosed in the drawings is rectangular in plan and provided with headed studs 5 at its four corners to hold a cover 6 in position over the open top of the receptacle to prevent escape of the live bait therein. The cover 6 is preferably made of duck or canvas, and as shown in the drawings is preferably made of two thicknesses of the material and provided with a heavy marginal edge 7 to make the cover relatively heavy to prevent sagging when in position. The cover 6 is also provided with eyelets or button-holes 8 to receive the headed studs 5 and hold the cover stretched in position on the top of the receptacle 3. It will be furthermore understood that by constructing the cover 6 of duck or canvas the cover may be kept moist by occasionally dipping it in water so as to maintain the live bait fresh as well as preventing the escape of the bait from the receptacle.

In a convenient position at the opposite end of the board 1 from the receptacle 3 is provided a spring clip 9 to hold the knife 10 or other tool that may be used for cutting or preparing the bait.

It will be understood that the device is also applicable in addition to the use heretofore referred to for holding cleaned fish after being scaled, the board being adapted to be used for supporting the fish during the scaling operation, and the clip 9 may be used for holding a suitable fish scaling tool, and the device may also be used for shucking oysters or for any other purpose to which it might be adapted.

What is claimed is:—

1. A container for the purpose stated, comprising an open-top receptacle, headed studs on the walls of said receptacle and projecting above its top, a cover of flexible absorbent material having eyelets therein to receive said studs to hold it on the receptacle, and the edges of said cover of double thickness to prevent the cover sagging when in position on the receptacle.

2. A live bait container, comprisng a receptacle having an open top, headed studs secured to the inner walls of said receptacle and projecting above its upper edge, a cover for said receptacle having eyelets to receive said studs and hold the cover in position, said cover consisting of two thicknesses of canvas to be saturated with water to maintain the contents of the receptacle fresh, and the edges of said two thicknesses of canvas doubled outwardly on opposite sides of the cover to maintain the cover in a rigid position and to prevent sagging.

In testimony whereof I affix my signature.

ELMER E. WILSON.